(12) United States Patent
Stimson

(10) Patent No.: US 6,600,247 B1
(45) Date of Patent: Jul. 29, 2003

(54) MOTOR STATOR CONNECTION METHOD AND APPARATUS

(75) Inventor: John Stimson, Kings Mountain, NC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 40 days.

(21) Appl. No.: 09/676,203

(22) Filed: Sep. 29, 2000

(51) Int. Cl.[7] .................................................. H02K 5/00
(52) U.S. Cl. .............................. 310/89; 310/71; 310/88
(58) Field of Search ............................... 310/89, 71, 88

(56) References Cited

U.S. PATENT DOCUMENTS

| | | | | |
|---|---|---|---|---|
| 1,917,607 A | * | 7/1933 | Sloane ..................... 310/68 R |
| 1,918,381 A | * | 7/1933 | Clarkson ..................... 174/59 |
| 3,562,405 A | * | 2/1971 | Ashford et al. ............ 174/52.1 |
| 4,205,246 A | * | 5/1980 | Wise et al. ............... 310/68 C |
| 5,073,736 A | * | 12/1991 | Gschwender et al. ......... 310/43 |
| 5,412,272 A | * | 5/1995 | Mensching ................. 310/112 |
| 5,424,600 A | * | 6/1995 | Ishikawa et al. ............ 310/220 |
| 5,856,717 A | | 1/1999 | Stimson ....................... 310/71 |
| 6,109,979 A | * | 8/2000 | Garnett ....................... 439/573 |
| 6,331,674 B1 | * | 12/2001 | Zolock et al. ................ 174/60 |

\* cited by examiner

Primary Examiner—Joseph Waks
(74) Attorney, Agent, or Firm—Patrick S. Yoder; Alexander M. Gerasimow; William R. Walbrun

(57) ABSTRACT

A method and apparatus are disclosed for electrically connecting a power cable to an explosion-proof electric motor having an electric motor housed within an explosion-proof motor housing. The electric motor has a plurality of motor conductors used to couple power to the electric motor stator. The explosion-proof motor housing has an opening and a connection housing securable to the explosion-proof motor housing to seal the opening. The connection housing has an internal volume to house the slack portions of power cable and motor conductors and the electrical connection formed between the power cable and the motor conductors.

19 Claims, 5 Drawing Sheets

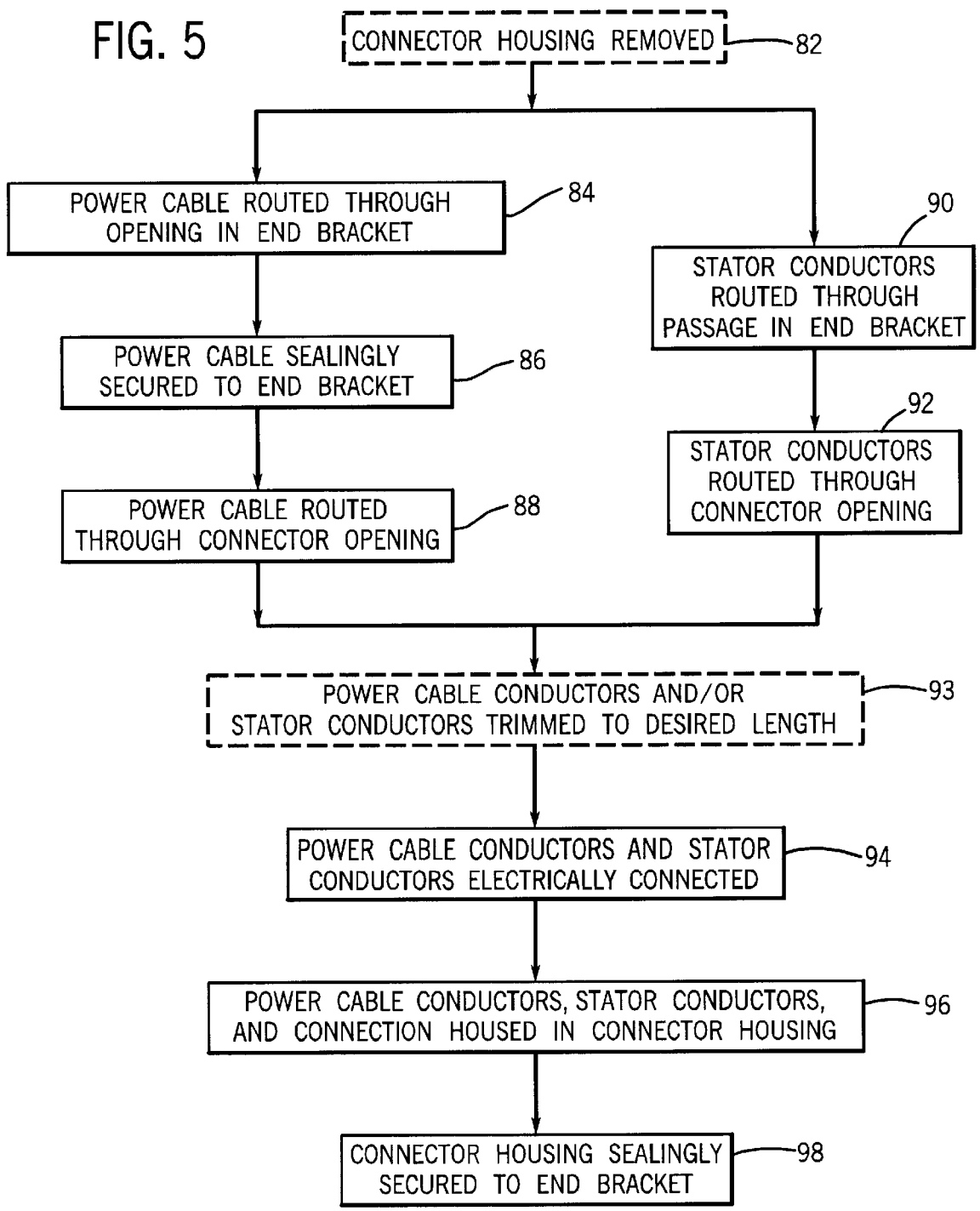

MOTOR STATOR CONNECTION METHOD AND APPARATUS

FIELD OF THE INVENTION

The present invention relates to method and apparatus for electrically connecting an explosion-proof electric motor to an electric power cable. More specifically, the present invention relates to a sealed housing for storing the electrical connection between the motor and the electric power cable.

BACKGROUND OF THE INVENTION

Electrically operated equipment that is intended for use in coal mines and similar controlled environments must conform to strict construction and design requirements to insure safety for its intended use. Among the requirements are those intended to prevent an electrical motor from causing an explosion in a mine environment. These types of motors are referred to as "explosion-proof motors." The Code of Federal Regulations provides detailed specifications for explosion-proof motors for use in coal mines and similar controlled environments, such as the requirements for the openings in the motor enclosure to be sealed. An electrical spark within an electric motor could ignite coal dust, grain dust, or any other airborne volatile substance, producing an explosion. Therefore, the requirements regarding the openings in the motor enclosure are an important preventative measure to keep such explosive substances out of the motor and any sparks generated by the motor in the motor housing.

Electric motors must be supplied with electrical power to operate. Typically, a power cable is routed to the electric motor through a sealable opening in an explosion-proof motor housing. An access panel is typically provided so that a cable installer can enter the interior of the explosion-proof motor housing to access the power cable and motor conductors in order to electrically connect them together. The access panel also has to conform to the requirements for openings in an explosion-proof motor housing. Once the connection is made, the power cable and motor conductors are forced back into the explosion-proof motor housing. The access panel is then secured to the motor housing.

Forcing the motor conductors and power cable back into the explosion-proof motor can result in damage to the motor leads, as well at to the power cable. The motor conductors and power cable may experience abrasion when forced through a constriction. Additionally, rotating portions of the electric motor may damage the motor conductors and power cable if these extend too far into the housing. Thus, a need exists for an explosion-proof motor, and for a method of electrically connecting an explosion-proof to power, that can protect the motor conductors and power cable from damage.

SUMMARY OF THE INVENTION

The present technique features an explosion-proof motor designed to respond to such needs. The explosion-proof motor assembly comprises an electric motor and an explosion-proof motor housing. The electric motor has a plurality of motor conductors. The explosion-proof motor housing comprises a first opening for receiving a power cable, a second opening for routing a power cable and the plurality of motor conductors to an exterior location. The explosion-proof motor housing also has a connection housing that is securable to the explosion-proof motor housing to seal the second opening. The connection housing has an internal volume to house the power cable, the plurality of motor conductors, and an electrical connection formed between the power cable and the plurality of motor conductors.

According to another aspect of the present technique invention, a connection housing for an explosion-proof electric motor is featured. The explosion-proof electric motor has a housing with a central volume to house an electric motor. The electric motor has motor conductors extending from the central volume through a passageway to the connection housing. The connection housing comprises a removable enclosure. The removable enclosure has an internal volume to house an electrical connection formed between the power cable and the motor conductors. Additionally, the removable enclosure houses substantially all excess length of the power cable and motor conductors.

The technique also features a method of wiring a power cable to an explosion-proof motor. The method comprises the act of disposing a plurality of power conductors through an opening in the explosion-proof motor housing to an exterior location. A plurality of stator conductors are routed through the opening in the explosion-proof motor housing. Electrical connections are formed between the plurality of power conductors and the plurality of stator conductors. The electrical connections and substantially all excess length of the power conductors and motor conductors are housed in a connection housing sealingly secured to the motor housing.

According to another aspect of the present technique, an explosion-proof motor comprises a stator having a stator conductor electrically coupled to a stator winding, and an explosion-proof motor housing. The explosion-proof motor housing has a first housing for housing the stator. The motor housing also has an end bracket securable to the rotor and stator housing. The end bracket has a first opening for receiving a power cable, and a second opening for routing a motor conductor and a third opening for routing the power cable and motor conductor. The explosion-proof motor housing also has a second housing securable to the end bracket to seal the second opening. The second housing has an internal volume to house an electrical connection formed between the power conductor and stator conductor, and excess portions of the power conductor and motor conductor. The internal volume is such that no excess portions of the power conductor and motor conductor need be disposed through the second opening when the second housing is secured to the first housing.

BRIEF DESCRIPTION OF THE DRAWINGS

The foregoing and other advantages of the invention will become apparent upon reading the following detailed description and upon reference to the drawings in which:

FIG. 5 is a block diagram of a method of electrically connecting a power cable to an explosion-proof electric motor configured as illustrated in the preceding Figures.

DETAILED DESCRIPTION OF SPECIFIC EMBODIMENTS

Figure 1:
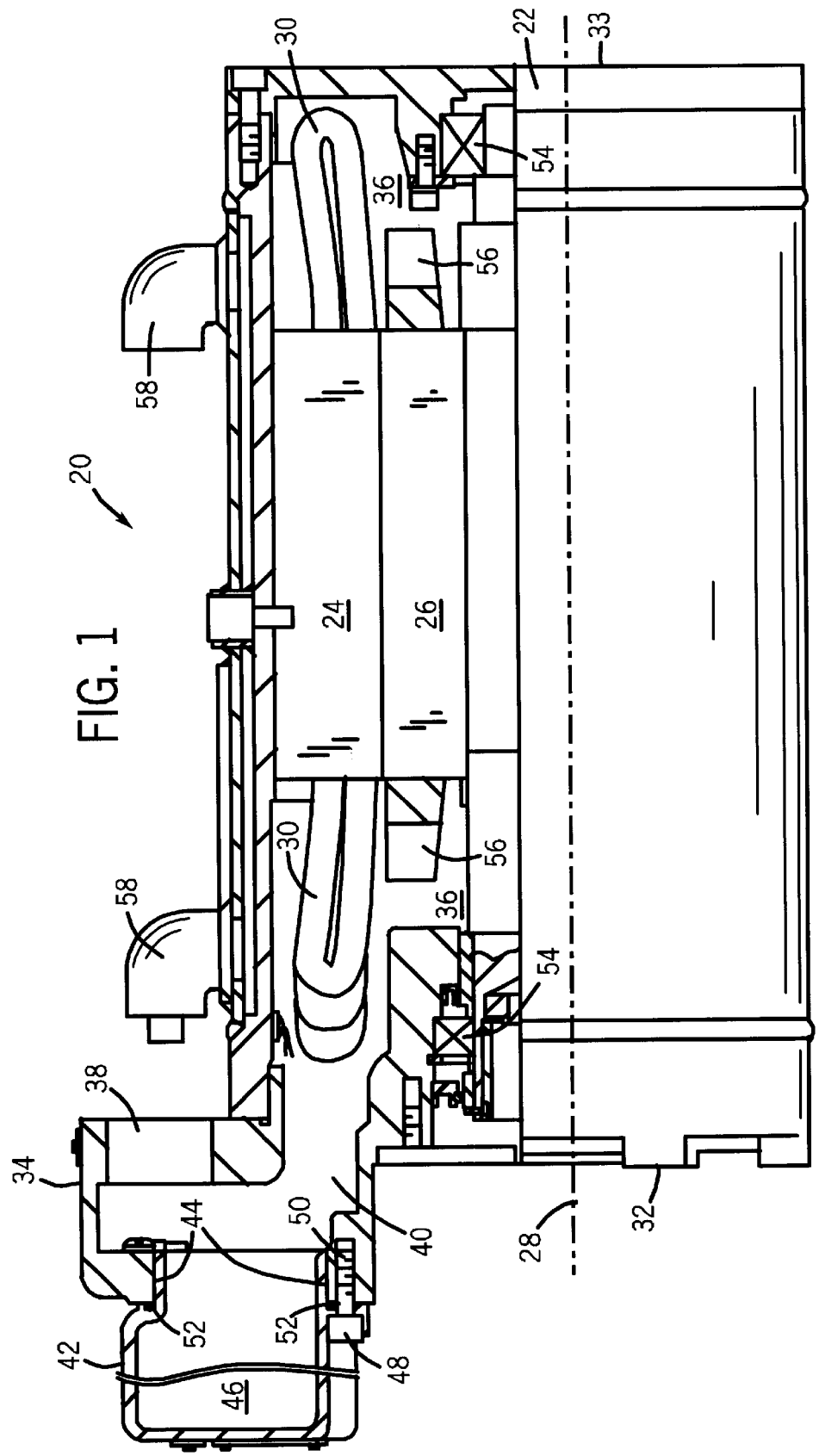
FIG. 1 is a partial front elevational view/cross-sectional view of an explosion proof electric motor, according to an exemplary embodiment of the present invention.

Turning now to the drawings, and referring first to FIG. 1, an explosion-proof electric motor 20 having a motor housing 22 is illustrated. A stator 24 and a rotor 26 are housed within the motor housing 22. Rotor 26 resides within a cavity formed by stator 24. Stator 24 produces a rotating magnetic field that induces rotor 26 to rotate about an axis 28. The magnetic field is produced by electricity flowing through a plurality of stator windings 30.

Motor housing 22 has an open end 32 through which electrical connections are made as described below, and an opposite end 33 closed by an end bracket. An end bracket 34 is secured to motor housing 22 at open end 32. End bracket 34 serves several functions. It provides easy access to stator 24 and rotor 26. Additionally, end bracket 34 is used to route a power cable (not shown in FIG. 1) into motor housing 22 to supply the electricity to stator windings 30. End bracket 34 also is used to close open end 32 to form a central volume 36 within motor housing 22.

The power cable and stator conductors are connected to supply electricity to the stator windings 30. End bracket 34 has a first opening 38 for routing the power cable into electric motor 20. Several stator conductors or leads from the stator windings 30 are routed through a second opening 40 formed in end bracket 34 (shown in FIG. 4 and discussed below). In the illustrated embodiment, a removable housing 42 is provided to enable an operator make the electrical connection between the power cable and stator conductors. For connection, the stator conductors are routed through a third opening 44 in end bracket 34 to housing 42. To make the electrical connection, the power cable and stator conductors typically are trimmed to a working length. The working length of a cable or wire typically includes some extra length to provide an installer with some flexibility in making the electrical connection. One method of making the electrical connection is to strip any insulation from the power cable and stator conductors and to splice the power cable and stator conductors together. The bare metal used to make the electrical connection may be protected with electrical tape, or some other means, such as wire nuts.

Initially, to connect the power cable and stator conductors, connector housing 42 is removed, if installed, to allow access to the power cable and stator conductors within end bracket 34. After the connection is made, connector housing 42 is secured to end bracket 34 to house the connection between the power cable and the stator conductors. Connector housing 42 has a connector volume 46 to house the connection and a quantity of excess wiring used to make the connection. Thus, the power cable and stator conductors need not be forced into the central volume 36 through second opening 40, as would be done in prior art arrangements, preventing damage to the wiring due to passing the conductors through second opening 40 or by rotating equipment in central volume 36.

Connector housing 42 is secured to end bracket 34 by screws 48 inserted into corresponding threaded holes 50 on end bracket 34. A sealing member 52, such as an O-ring, is used to sealingly secure connector housing 42 to end bracket 34.

Additional components of electric motor 20 include rotor bearings 54 and fan members 56 secured to rotor 26 to provide cooling air flow within motor housing 22. Additional cooling may be provided by circulating cooling water through motor 20. Water fittings 58 are used as supply and return connections for cooling water to cool motor 20.

Figure 2:
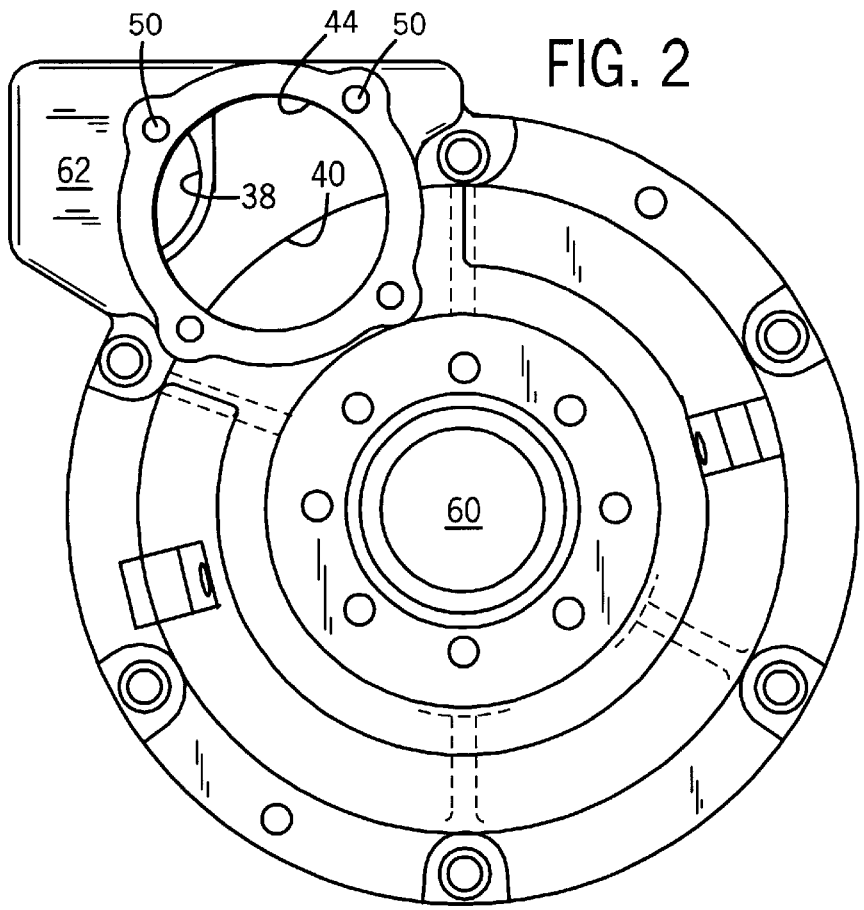
FIG. 2 is a front elevational view of an end bracket for an explosion-proof electric motor, according to an exemplary embodiment of the present invention.
Figure 2A:
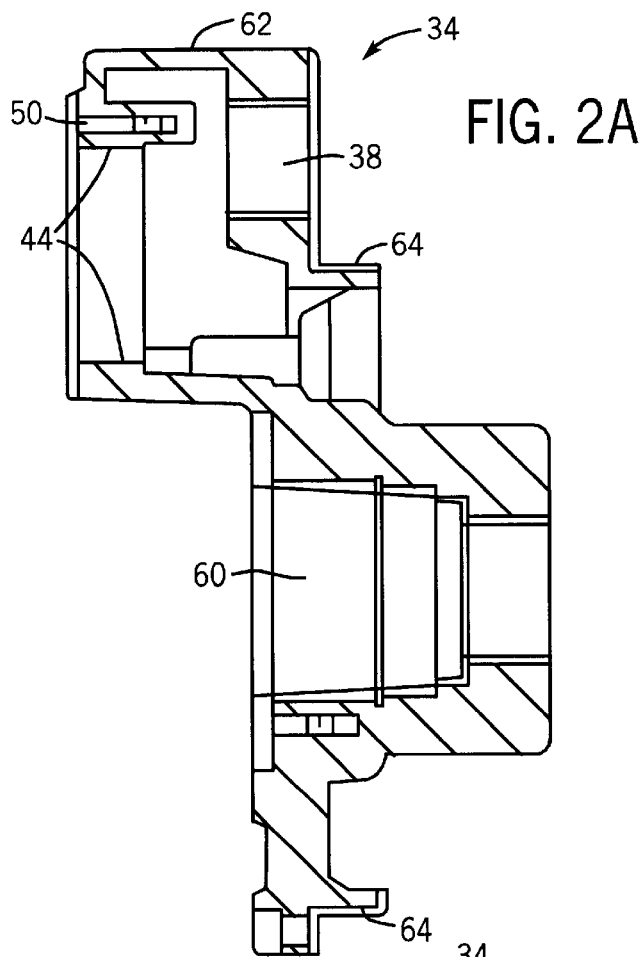
FIG. 2A is a cross-sectional view of the end bracket of FIG. 2.

Referring generally to FIG. 2, end bracket 34 has a shaft opening 60 and a connector housing mount 62. Shaft opening 60 is used to couple the rotor to an external component. As best illustrated in FIG. 2A, end bracket 34 has a receiving member 64 to secure end bracket 34 to motor housing 22. In this embodiment, receiving member 64 is circular and extends around end bracket 34. Receiving member 64 is inserted into open end 32 of motor housing 22 and secured thereto.

Figure 3:
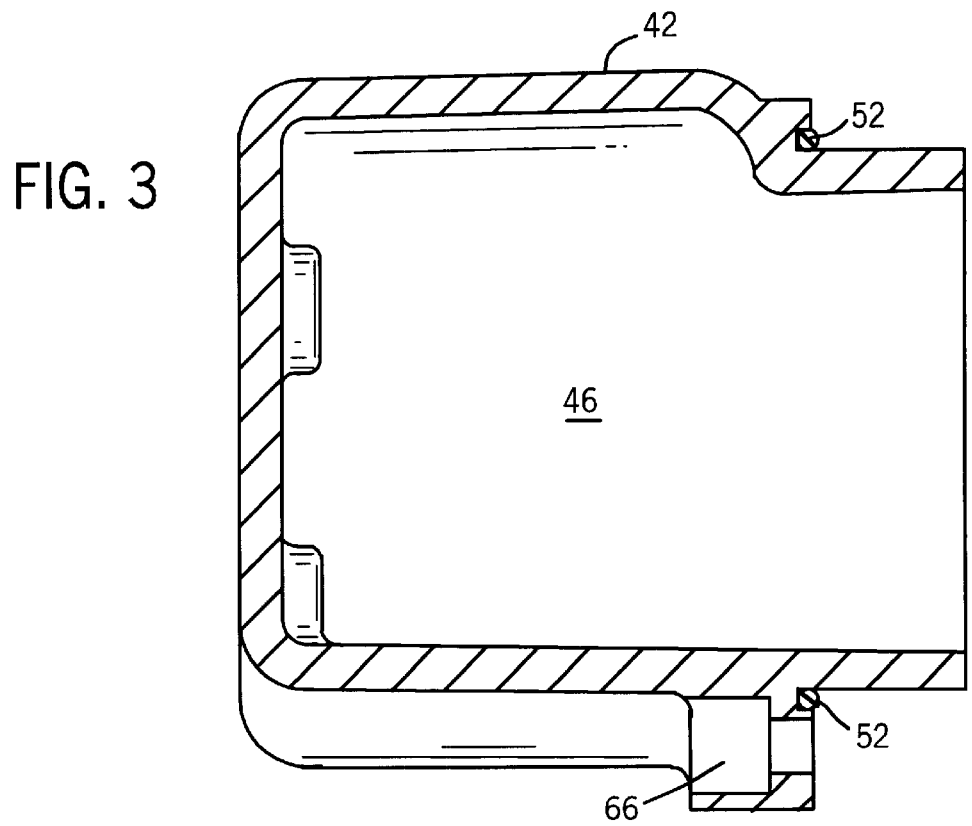
FIG. 3 is a cross-sectional view of a connector housing, according to an exemplary embodiment of the present invention.

Referring generally to FIG. 3, connector housing 42 has four holes 66 through which screws 48 are inserted. In the illustrated embodiment, connector housing 42 has a recess in which o-ring seal 52 may be inserted. Preferably, connector housing 42 is made of metal and formed using a casting process.

Figure 4:
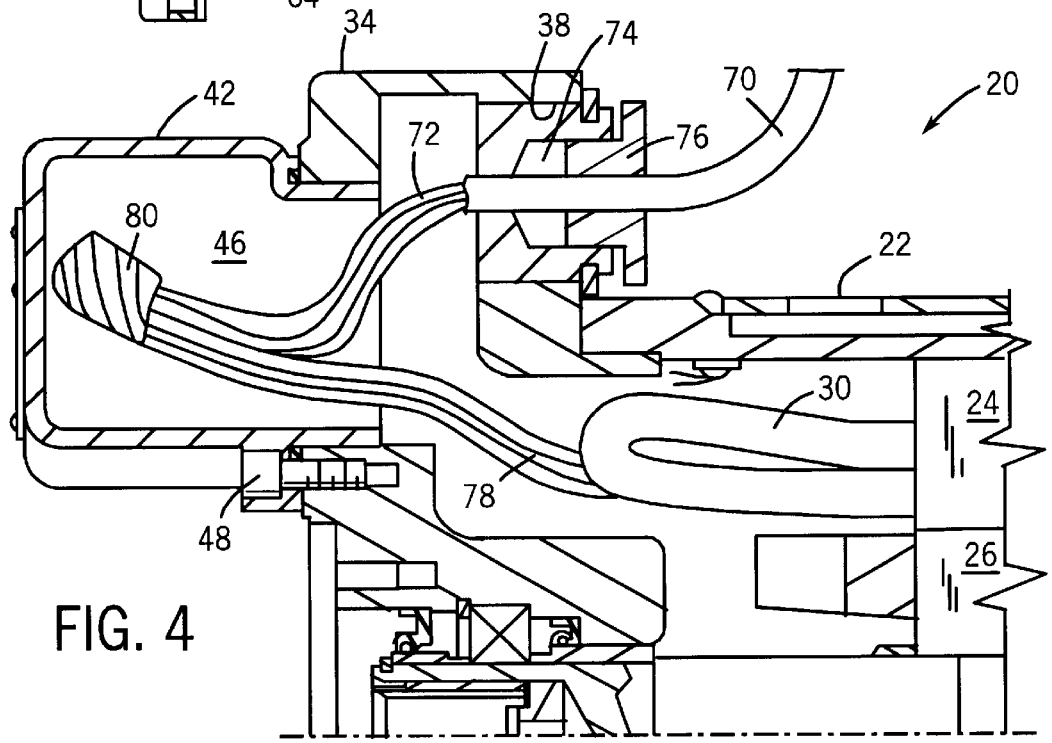
FIG. 4 is a cross-sectional view of a portion of an explosion-proof motor, illustrating a connector housing and wiring disposed therein.
Figure 3A:
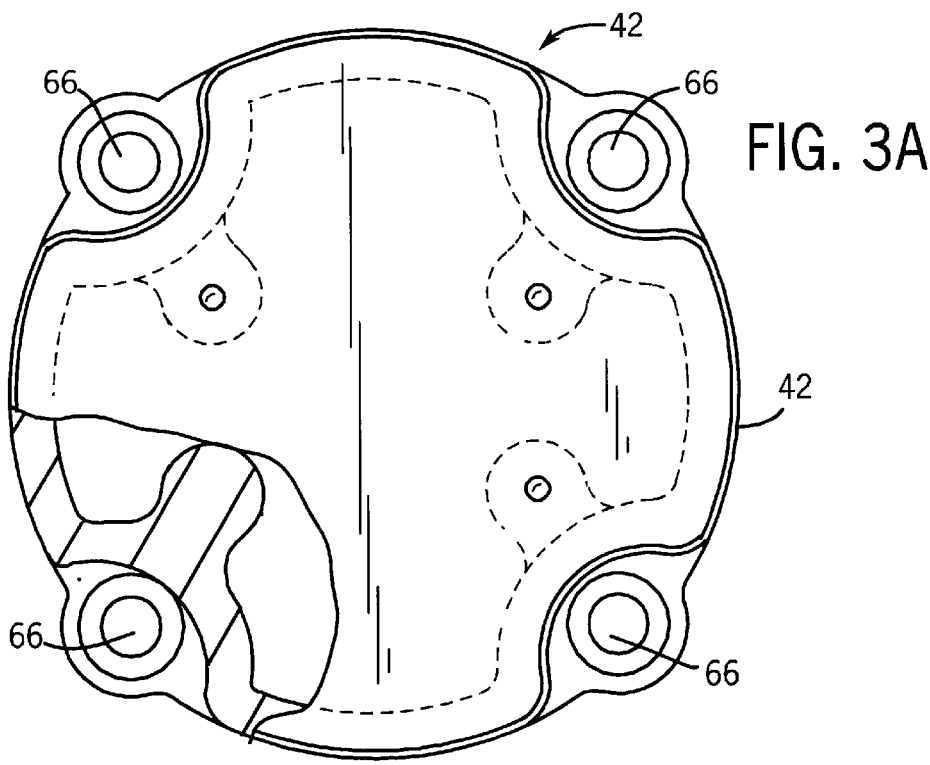
FIG. 3A is a first end view of the connector housing of FIG. 3.
Figure 3B:
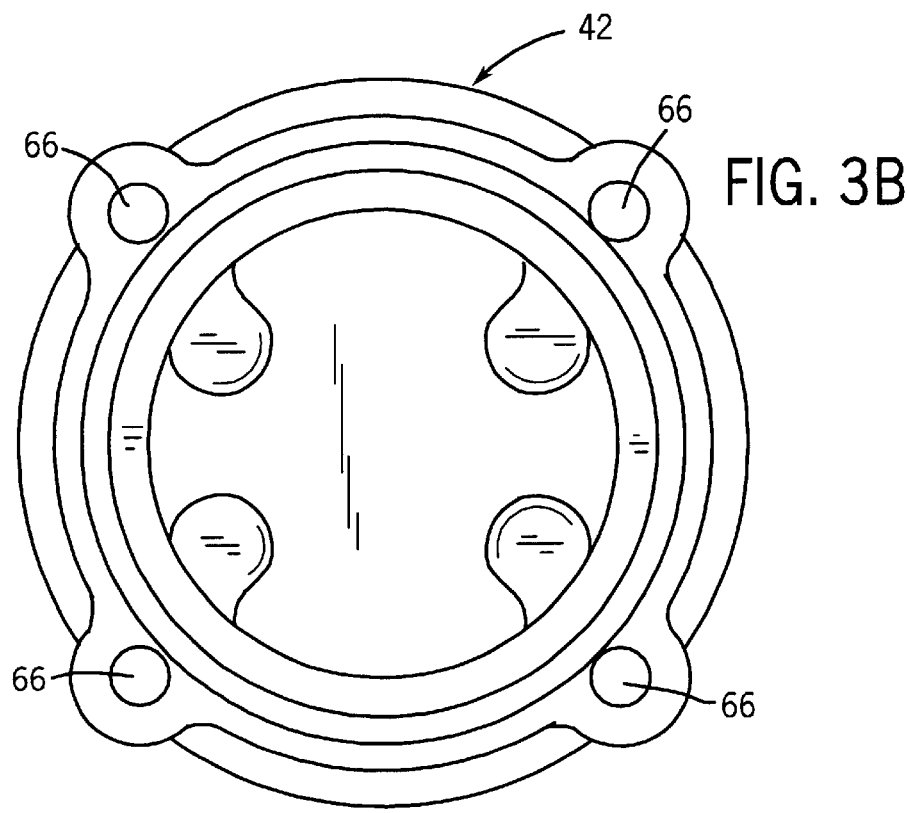
FIG. 3B is a second end view of the connector housing of FIG. 3.

Referring generally to FIG. 4, a completed electrical connection between a power cable 70 and stator 24 is illustrated. Power cable 70 includes a plurality of conductors 72. Power cable 70 is inserted through lead out opening 38. Packing 74 and a packing gland 76 are used to sealingly secure power cable 70 to end bracket 34. A plurality of stator conductors 78 are routed from stator windings 30. Power cable conductors 72 and stator conductors 78 are connected together to form an electrical connection 80. Connector volume 46 houses the connection and the excess length of power conductors 72 and stator conductors 78. Thus, the excess length of power cable conductors 72 and stator conductors 78 need not be forced back into the motor through the end bracket second opening. Maintaining the excess length in connector housing 42, rather than passing the wiring through the bracket opening prevents abrasion damage to power conductors 72 and stator conductors 78. This also prevents damage to the wiring caused by contact with rotating elements within the motor.

Referring generally to FIG. 5, an exemplary method of electrically coupling a power cable to an electric motor is summarized. Initially, connector housing 42 is removed, if installed, as referenced by block 82. Power cable 70 is inserted through lead out opening 38, as referenced by block 84. From first opening 38, power cable 70 is drawn through third opening 44 to the exterior of explosion-proof motor 20, as referenced by block 86. Preferably, power cable 70 is now sealingly secured to end bracket 34, as referenced by block 88. However, this step may be performed at another time once after power cable 70 has been routed through first opening 38.

If not previously done, the stator conductors 78 are routed through second opening 40, as referenced by block 90. The stator conductors are then routed through third opening 44 to the exterior of explosion-proof motor 20, as referenced by block 92. As part of the routing of stator conductors 78 and power cable 70 through third opening 44, the slack may be pulled from their respective lengths so that little excess portions of the stator conductors 78 and power cable 70 remain inside motor housing 22. Power cable conductors 72 and stator conductors 78 may be trimmed to reduce their overall length if their respective initial lengths are longer than necessary to make an electrical connection, as referenced by block 93. Power cable conductors 72 and stator conductors 78 are then coupled together to form electrical connection 80, as referenced by block 94. Instead of forcing the power cable conductors 72, stator conductors 78, and connection 80 back into the motor housing through second opening 40, the portion of power cable conductors 72, stator conductors 78, and connection 80 extending through third opening 44 are housed in connector housing 42, as referenced by block 96. Connector housing 42 is then sealingly secured to end bracket 34 to form an explosion-proof motor housing, as referenced by block 98.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An explosion-proof motor assembly, comprising:
    an electric motor having a plurality of motor conductors to couple power to the electric motor;
    an explosion-proof motor housing, comprising:
        an opening for accessing a power cable and the plurality of motor conductors; and
        a connection housing securable to the explosion-proof motor housing to seal the opening, the connection housing having an internal volume to house the power cable, the plurality of motor conductors, and an electrical connection formed between the power cable and the plurality of motor conductors.

2. The explosion-proof motor assembly as recited in claim 1, wherein the explosion-proof motor housing is configured to form a seal around the power cable.

3. The explosion-proof motor assembly as recited in claim 1, wherein the explosion-proof motor housing comprises:
    a central housing, wherein the electric motor is disposed; and
    an end bracket secured to the central housing.

4. The explosion-proof motor assembly as recited in claim 3, wherein the connection housing is sealingly secured to the end bracket.

5. The explosion-proof motor assembly as recited in claim 4, wherein the end bracket comprises a rotor shaft opening.

6. The explosion-proof motor housing assembly as recited in claim 4, wherein the end bracket comprises a second opening adapted to receive the power cable.

7. The explosion-proof motor housing assembly as recited in claim 4, wherein the end bracket comprises a third opening adapted to receive the plurality of motor conductors.

8. The explosion-proof motor assembly as recited in claim 3, comprising an o-ring to form a seal between the connection housing and the end bracket.

9. The explosion-proof motor assembly as recited in claim 1, comprising a plurality of securing members for securing the connection housing to the explosion-proof motor housing.

10. The explosion-proof motor housing assembly as recited in claim 1, wherein the plurality of motor conductors comprises a plurality of conductors electrically coupled to a stator of the electric motor.

11. An explosion-proof motor, comprising:
    a stator having a stator conductor electrically coupled to a stator winding;
    an explosion-proof motor housing, comprising:
        a first housing having the stator disposed therein; and
        an end bracket securable to the first housing, comprising:
            a first opening for receiving a power conductor;
            a second opening for receiving the stator conductor; and
            a third opening for routing the power cable and stator conductor; and
        a second housing securable to the end bracket to seal the third opening, the second housing having an internal volume to house an electrical connection formed between the power conductor and stator conductor.

12. The explosion-proof motor as recited in claim 11, wherein the stator conductor and power conductor are cut to an initial length prior to forming an electrical connection between the power conductor and stator conductor.

13. The explosion-proof motor as recited in claim 11, comprising:
    a sealing member disposed between the end bracket and the power conductor.

14. The explosion-proof motor as recited in claim 11, wherein the second housing is adapted to house excess portions of the motor conductor to prevent the motor conductor from engaging rotating equipment within the fist housing.

15. The explosion-proof motor as recited in claim 14, wherein the second housing is adapted to house excess portions of the power conductor to prevent the power conductor from engaging rotating equipment within the first housing.

16. The explosion-proof motor as recited in claim 11, wherein the second housing is adapted to extend through the third opening.

17. The explosion-proof motor as recited in claim 11, wherein the end bracket comprises a rotor shaft opening.

18. An explosion-proof electric motor, comprising:
    a motor housing having an interior volume adapted to house a rotor and a stator;
    an end cover sealingly securable to the motor housing and having an opening therein;
    a second housing adapted to seal the opening in the end cover; and
    an electrical conductor electrically coupled to the stator, the electrical conductor being adapted to extend from the interior volume to an exterior location through the opening in the end cover for connection to a power cable extending through the opening,
    wherein the second volume is adapted to house an excess portion of the electrical conductor to prevent the electrical conductor from contacting rotating components disposed within the interior volume.

19. The electric motor as recited in claim 18, wherein the end cover is adapted with a cable opening for receiving a power cable into the second volume.

* * * * *